Patented May 23, 1944

2,349,795

UNITED STATES PATENT OFFICE 2,349,795

DERIVATIVES OF 2,4-OXAZOLIDINEDIONE

Roger W. Stoughton, Ferguson, Mo., assignor to Mallinckrodt Chemical Works, St. Louis, Mo., a corporation of Missouri No Drawing. Application January 14, 1942, Serial No. 426,783

4 Claims. (Cl. 260—307)

This invention relates to new derivatives of 2,4-oxazolidinedione, and with regard to certain more specific features, to such derivatives which represent substitutions in the 5-position by two alkyl radicals, one of which contains at least three carbon atoms.

This application is a continuation-in-part of my copending application Serial No. 318,321, filed February 10, 1940.

Among the several objects of this invention may be noted the provision of new chemical compounds which are 5-substituted derivatives of 2,4-oxazolidinedione, and their alkali and alkaline earth metal salts, useful as therapeutics and the provision of new intermediates for the preparation of these compounds. Other objects will be in part obvious and in part pointed out hereinafter.

The invention accordingly comprises the elements and combinations of elements, the proportions thereof, and features of composition, which will be exemplified in the substances and products hereinafter described, and the scope of the application of which will be indicated in the following claims.

The compounds included in this invention may be represented by the following type formula:

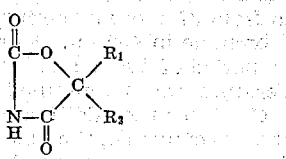

in which $R_1$ is an alkyl radical and $R_2$ is an alkyl radical containing four or five carbon atoms.

Throughout the specification and claims where the term alkyl appears, it will be understood that cycloalkyl radicals are included.

Example 1

Typical of the compounds included in the present invention is the 5-methyl-5-n-butyl derivative of 2,4-oxazolidinedione. This compound may be represented by the following structural formula:

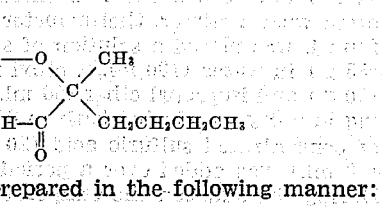

and may be prepared in the following manner:

A mixture of 0.2 mol of ethyl α-n-butyl-α-methyl-α-hydroxyacetate (prepared, for example, by the hydrolysis and subsequent esterification of the cyanohydrin of methyl-n-butyl ketone, or, as described in Example 5, post), with 0.25 mol of dry urea is dissolved in 100 ml. of a 2.5 normal solution of sodium ethylate in absolute alcohol. The mixture is heated under a reflux for from ten to twelve hours, after which the alcohol is distilled off under reduced pressure, and the residue dissolved in a minimum amount of cold water. The unreacted ester is then extracted with ether, the extracted aqueous solution is then acidified, and an oil separates out. This oil is purified by distillation under reduced pressure. The product is a colorless oil boiling between 148 and 151° C. under 3.5 mm. pressure. It is slightly soluble in water, and easily soluble in alcohol, ether, benzene and petroleum ether.

Example 2

5-methyl-5-n-amyl-2,4-oxazolidinedione is obtained by substituting for the ester in Example 1, ethyl α-n-amyl-α-methyl-α-hydroxyacetate. The product is obtained as a waxy solid, melting at 25° C. to a colorless oil, which boils at 158 to 160° C. under 4 mm. pressure. It is very slightly soluble in water and easily soluble in alcohol, ether, benzene and petroleum ether.

Example 3

5-ethyl-5-isoamyl-2,4-oxazolidinedione is obtained by substituting for the ester in Example 1, ethyl α-ethyl-α-isoamyl-α-hydroxyacetate. The product is obtained as a colorless oil boiling from 150 to 153° C. under 2.5 mm. pressure. It is insoluble in water, but easily soluble in alcohol, ether, benzene and petroleum ether.

Example 4

5-n-amyl-5-ethyl-2,4-oxazolidinedione is prepared as follows: Sodium metal (6.2 g.) was dissolved in dry methyl alcohol (70 ml.) in a three-necked, 500 ml. flask, fitted with a reflux condenser and a mercury sealed stirrer. To the cooled solution was added a solution of α-ethyl-α-hydroxy enanthamide (46 g.) in diethyl carbonate (32 g.) over a ten minute period. The reaction mixture was refluxed for six hours. After the alcohol had been distilled off at atmospheric pressure, the cooled residue was dissolved in ice water (300 ml.) and the resultant yellowish solution extracted with three 50 ml. portions of isopropyl ether. The aqueous solution was next treated with about 1 g. of bonecoal, and after filtering, the clear, colorless solution was acidified with hydrochloric acid. The precipitated oil was taken up in ether and distilled in a Claisen flask under reduced pressure. The fraction boiling at 136–139° C. at 3 mm. pressure was collected and amounted to 45 g. (85%) of essentially pure 5-n-amyl-5-ethyl-2,4-oxazolidinedione. This was finally purified by recrystallization from petroleum ether. The pure substance melted at 30° C. It is insoluble in water, but soluble in the common organic solvents, including warm petroleum ether.

As has been indicated above, the ester which is condensed with urea to prepare the oxazolidinedione compounds described above may be conveniently obtained by the hydrolysis and subsequent esterification of the cyanohydrin of the corresponding dialkylketone. In some instances, however, it may be more convenient to obtain the material for the urea condensation in other manners.

Example 5

Ethyl α-n-butyl-α-methyl-α-hydroxyacetate was prepared as follows: in a one-liter three-necked flask, fitted with a mechanical stirrer and dropping funnel, are placed a solution of 26 g. (0.5 mol) of sodium cyanide (techincal cyanegg) in 75 ml. of water, and 50 g. (0.5 mol) of n-butyl methyl ketone. The flask was cooled in an ice bath, stirred vigorously, and 130 ml. of a saturated solution of sodium bisulfite was added to the mixture over a period of one and a half hours. Stirring was continued for a half hour after the addition of the bisulfite had been completed. The cyanohydrin layer was separated and dissolved in 200 ml. of absolute alcohol, to which 5 ml. of water had been added. This mixture was saturated with dry gaseous hydrogen chloride, and refluxed for twenty hours. From time to time the ammonium chloride which separated was filtered off, to prevent bumping. The excess alcohol was then removed by distillation from the steam bath, and the residue poured onto cracked ice. The resulting oil was taken up in ether, washed with a sodium carbonate solution, and distilled. A small amount of free acid was recovered from the carbonate washings. The ethyl ester so obtained had a boiling point of 100 to 101° C. under 25 mm. pressure. The corresponding acid, namely, α-n-butyl-α-methyl-α-hydroxyacetic acid, obtained by hydrolyzing the ester, had a melting point of 33° C. and a boiling point under 5 mm. pressure of 127 to 129° C.

The ester product so obtained may then be converted by the procedure outlined above to 5-methyl-5-n-butyl-2,4-oxazolidinedione, by reaction with urea.

Example 6

Ethyl α-n-amyl-α-methyl-α-hydroxyacetate was prepared by substituting methyl n-amyl ketone for the methyl n-butyl ketone in Example 5. The ester so obtained boils between 112 and 113° C. under 23 mm. pressure. The corresponding acid has a melting point of 44 to 45° C. and a boiling point of 139 to 140° C. under 6 mm. pressure. The ester product may be converted into 5-methyl-5-n-amyl-2,4-oxazolidinedione by the method outlined above.

Example 7

Ethyl α-ethyl-α-isoamyl-α-hydroxyacetate is prepared as follows: Into a three-liter, three-necked flask fitted with a mechanical stirrer, reflux condenser and dropping funnel, were placed 9.2 g. of magnesium turnings, 5 ml. of ethyl bromide and 25 ml. of anhydrous ether. A crystal of iodine was added, and after the reaction had started, 250 ml. of ether were added. A mixture of 43 g. of ethyl-α-keto-δ-methylcaproate (prepared as described in the following example (and 38 g. of ethyl bromide was then added dropwise through the separatory funnel, at such a rate as to cause the ether to reflux gently. This required about six hours. The flask was then heated by means of a water bath for one hour, and then allowed to stand over night at room temperature. The next morning the reaction mixture was cooled and decomposed by the slow addition of 150 ml. of 6N sulfuric acid, and an equal volume of water. The ethereal layer was separated, washed with sodium carbonate solution, and distilled. The fraction boiling at 105 to 120° C. under 20 mm. pressure was collected. This crude product was stirred with 100 ml. of a saturated sodium bisulfite solution, and allowed to stand for twenty-four hours. At the end of this time, the sodium bisulfite addition product of the unchanged keto ester was removed by filtration, and the hydroxy acid ester taken up in benzene. This was further purified by careful rectification through an efficient fractionating column. This method of purification leaves a little keto acid present, but it can be removed by hydrolyzing the ester, and recrystallizing the acid from petroleum ether or dilute methanol, if desired. The acid melts at 69 to 70° C. and boils without decomposition at 121 to 125° C. under a pressure of 3 mm. The pure ester boils at 114 to 115° C. under a pressure of 20 mm. The ester product so obtained may be reacted with urea to form 5-ethyl-5-isoamyl-2,4-oxazolidinedione.

Example 8

Ethyl α-keto-δ-methylcaproate is prepared as follows: In a three-liter, three-necked flask fitted with a mechanical stirrer, reflux condenser and dropping funnel, were placed 146 g. (1 mol) of ethyl oxalate dissolved in 500 ml. of anhydrous ether. The flask was cooled in an ice-salt bath, the stirrer started, and one molecular equivalent of isoamyl magnesium bromide prepared from 27 g. of magnesium and 151 g. of isoamyl bromide in 400 ml. of dry ether was added over a period of five hours. During this time the temperature was maintained between −5° and −10° C. After the addition of the Grignard reagent was completed, the mixture was stirred for two hours longer and allowed to stand over night at room temperature. The flask was again cooled and the reaction mixture decomposed by slowly adding 300 ml. of 6N sulfuric acid, with vigorous stirring. The ether layer was separated, washed with a sodium carbonate solution, and distilled through an efficient fractionating column. The boiling point of the ester was 109 to 110° C. under 20 mm. pressure. The corresponding semicarbazone had a melting point of 160 to 161° C.

Example 9

α-Hydroxy-α-ethyl enanthamide is prepared as follows: Into a 500 ml., three-necked flask, fitted with a stirrer, thermometer and dropping funnel, was placed a solution of sodium cyanide (35 g.) in water (130 ml.), ethyl n-amyl ketone (80 g.) and isopropyl ether (60 ml.). After cooling in a dry ice-alcohol bath to 0° C., a solution of concentrated sulfuric acid (20 ml.) in water (50 ml.) was added over a period of two hours. During the addition the temperature was maintained between 0° C. and 5° C. The oil which had separated was collected and to it was added with stirring and cooling concentrated sulfuric acid (130 ml.), which had been previously diluted with water (13 ml.) and cooled. The addition required 25 minutes, and the temperature was maintained between −10° C. and −5° C. Stirring was continued for one hour at 0° C. and the reaction mixture allowed to stand over night at room temperature. The next morning the solution was poured onto cracked ice (600 g.) and the oil layer taken up in ether. The ether solution was washed with sodium carbonate and finally with water. The product was finally distilled under reduced pressure. The fraction boiling at 131–134° C. was collected and amounted to 54 g. (50%) of a pale-yellow oil. This oil solidified on standing, and melted at 43–45° C. Pure α-ethyl-α-hydroxy enanthamide could be obtained by recrystallization from chloroform and petroleum ether mixture, and melted at 49–50° C.

All of the oxazolidinedione compounds described above behave as mono-basic acids, and form salts with alkali and alkaline earth metal hydroxides or carbonates. These salts may be conveniently prepared merely by reacting an equivalent of the alkali or alkaline earth metal hydroxide or carbonate with the oxazolidinedione.

The 5-substituted 2,4-oxazolidinedione compounds prepared in accordance with the present invention have especially valuable therapeutic properties. Moreover, it has been found that the efficient dose for their therapeutic effect is far less than a lethally toxic dose. These products may be used in any of the forms usually employed, for example, their solutions may be administered orally or by subcutaneous or intramuscular injection.

In view of the above, it will be seen that the several objects of the invention are achieved and other advantageous results attained.

As many changes could be made in the above substances and products without departing from the scope of the invention, it is intended that all matter contained in the above description shall be interpreted as illustrative and not in a limiting sense.

I claim:

1. A compound selected from the group consisting of 5-methyl-5-n-butyl-2,4-oxazolidinedione, 5-methyl-5-n-amyl-2,4-oxazolidinedione, 5-ethyl-5-isoamyl-2,4-oxazolidinedione, and 5-ethyl-5-n-amyl-2,4-oxazolidinedione, said compound being prepared for use as a therapeutic.
2. 5-methyl-5-n-amyl-2,4-oxazolidinedione.
3. 5-ethyl-5-isoamyl-2,4-oxazolidinedione.
4. 5-ethyl-5-n-amyl-2,4-oxazolidinedione.

ROGER W. STOUGHTON.